United States Patent
Rumbaugh et al.

(10) Patent No.: US 6,842,519 B1
(45) Date of Patent: Jan. 11, 2005

(54) COMMUNICATION WITH CURRENT DETECTION

(76) Inventors: Stephen Roy Rumbaugh, 4916 Shadowfalls Dr., Martinez, CA (US) 94553; Garth Wayne Haslam, 1068 Fox Meadow Way, Concord, CA (US) 94518

(*) Notice: Subject to any disclaimer, the term of this patent is extended or adjusted under 35 U.S.C. 154(b) by 121 days.

(21) Appl. No.: 09/843,999

(22) Filed: Apr. 27, 2001

(51) Int. Cl.[7] .............................................. H04B 3/00
(52) U.S. Cl. .................. 379/399.01; 379/413; 375/257; 375/272; 375/312
(58) Field of Search ................................. 340/664, 596, 340/508; 375/312, 272, 222, 259, 257; 327/101, 108, 129; 379/413

(56) References Cited

U.S. PATENT DOCUMENTS

| | | | | |
|---|---|---|---|---|
| 5,485,488 A | * | 1/1996 | Van Brunt et al. | 375/257 |
| 6,005,933 A | | 12/1999 | Takato | 379/322 |

OTHER PUBLICATIONS

Current Loop Application Note, Document No. CLAN1495. . (c) 1995 B&B Electronics. 13 pages.
Datel, DMS Application Note, 4–20mA Current Loop Printer. 3 pgs.
Stephen Woodward, Electronic Design, Nov. 20, 2000. Simple Current–Loop Transmitter Converts PWM To 4–to–20–mA Output. pp. 147–148.
Karl F. Anderson, National Aeronautics and Space Administration, 1994, Practical Applications of Current Loop Signal Conditioning. pp. 1–19.

* cited by examiner

*Primary Examiner*—Forester W. Isen
*Assistant Examiner*—Daniel Swerdlow
(74) *Attorney, Agent, or Firm*—Blakely, Sokoloff, Taylor & Zafman

(57) ABSTRACT

Apparatuses and methods are disclosed for communications using current detection. According to one embodiment, a transmitter generates a signal on a transmission line by switching between two power sources. According to one embodiment, the transmitted signal is a balanced signal. Under an embodiment, a signal that has been transmitted on the transmission line is received by a receiver that includes a current detector, and the receiver detects the signal by sensing changes in current on the transmission line. According to one embodiment, the current detector includes a sensor that senses changes in the magnetic field generated by changes in current in the transmission line.

8 Claims, 7 Drawing Sheets

Transmitter

Figure 1   Full-Duplex Current Loop
(Prior Art)

Figure 2   Simplex Current Loop
(Prior Art)

Transmitted Signal With Offset Voltage

Transmitted Signal Without Offset Voltage

COMMUNICATION WITH CURRENT DETECTION

FIELD OF THE INVENTION

This invention relates to communication systems in general, and more specifically to operation of a communication system using current detection.

BACKGROUND OF THE INVENTION

Communication using current detection has been used in current loop communications technology for many years. For example, in the 1960's, military teleprinters used 60 milliamp current loops to communicate. In later periods, 20 milliamp current loops became more prevalent. In a conventional current loop, a current source provides a specified current on a loop. A signal is transmitted on the current loop by opening and shutting a switch within the loop. A receiver utilizes a current detector to receive the transmitted signal. Current loops have the advantage that they allow longer communications paths than certain other technologies. Converters may be used to convert signals to, for example, RS-232 format for communication with computers.

FIG. 1 illustrates a full-duplex current loop. In this instance, both parties to the communication can send and receive a signal simultaneously. In this illustration, first participant 100 and second participant 110 communicate with each other. First participant 100 in FIG. 1 is an "active" participant because first participant 100 provides the current sources 140 and 170 for the current loop system. Second participant 110 is a "passive" participant. In such a conventional full-duplex current loop, it is possible for either or both participants to be active, depending on the design of the system.

The system shown in FIG. 1 includes two circuit loops, a first circuit loop 120 and a second circuit loop 130. In first circuit loop 120, first participant 100 is the receiving participant and second participant 110 is the transmitting participant. In second circuit loop 130, first participant 100 is the transmitting participant and second participant 110 is the receiving participant.

Within first circuit loop 120, current source 140 produces a current through the circuit loop. Second participant 110 transmits a signal on first circuit loop 120 by opening or closing switch 150. First participant 100 then receives the signal transmitted by second participant 110 by detecting the current in first loop 110 using current detector 160. Similarly, within second circuit loop 130, current source 170 produces a current through the circuit loop. First participant 100 transmits a signal on second circuit loop 130 by opening or closing switch 180. Second participant 110 then receives the signal transmitted by first participant 100 by detecting the current in first loop 130 using current detector 190.

FIG. 2 illustrates a simplex, or half-duplex, current loop. In this instance, only one party to the communication can send a message at any time. In this illustration, first participant 200 and second participant 210 communicate with each other. First participant 200 in FIG. 2 is the "active" participant because first participant 200 provides the current source 230 for the current loop system. Second participant 210 is a "passive" participant. In a conventional simplex current loop, it is possible for either participant to be the active participant depending on the design of the system. The system shown in FIG. 2 includes a single circuit loop 220. In the circuit loop 220, first participant 200 and second participant 210 alternate as the transmitting participant and the receiving participant.

Within circuit loop 220, current source 230 produces a current through circuit loop 220. In one instance, first participant 200 transmits a signal on circuit loop 220 by opening or closing switch 240. Second participant 210 then receives the signal transmitted by first participant 200 by detecting the current in circuit loop 220 using current detector 270. In a second instance, second participant 210 transmits a signal on circuit loop 220 by opening or closing switch 250. First participant 200 then receives the signal transmitted by second participant 210 by detecting the current in circuit loop 220 using current detector 260.

The conventional current loops illustrated in FIGS. 1 and 2 have characteristics that limit the usefulness of these communications systems. Among other issues, the conventional transmission of a signal by opening and closing a circuit connection creates an unbalanced transmission signal that results in significant noise problems. While communications over relatively long distances are possible with a current loop system, the noise that is present on a conventional current loop system limits the speed that can be realized by the system, and thereby limits the usefulness of the system in modern high-speed communications.

BRIEF DESCRIPTION OF THE DRAWINGS

The appended claims set forth the features of the invention with particularity. The invention, together with its advantages, may be best understood from the following detailed description taken in conjunction with the accompanying drawings, of which:

DETAILED DESCRIPTION

Figure 1:
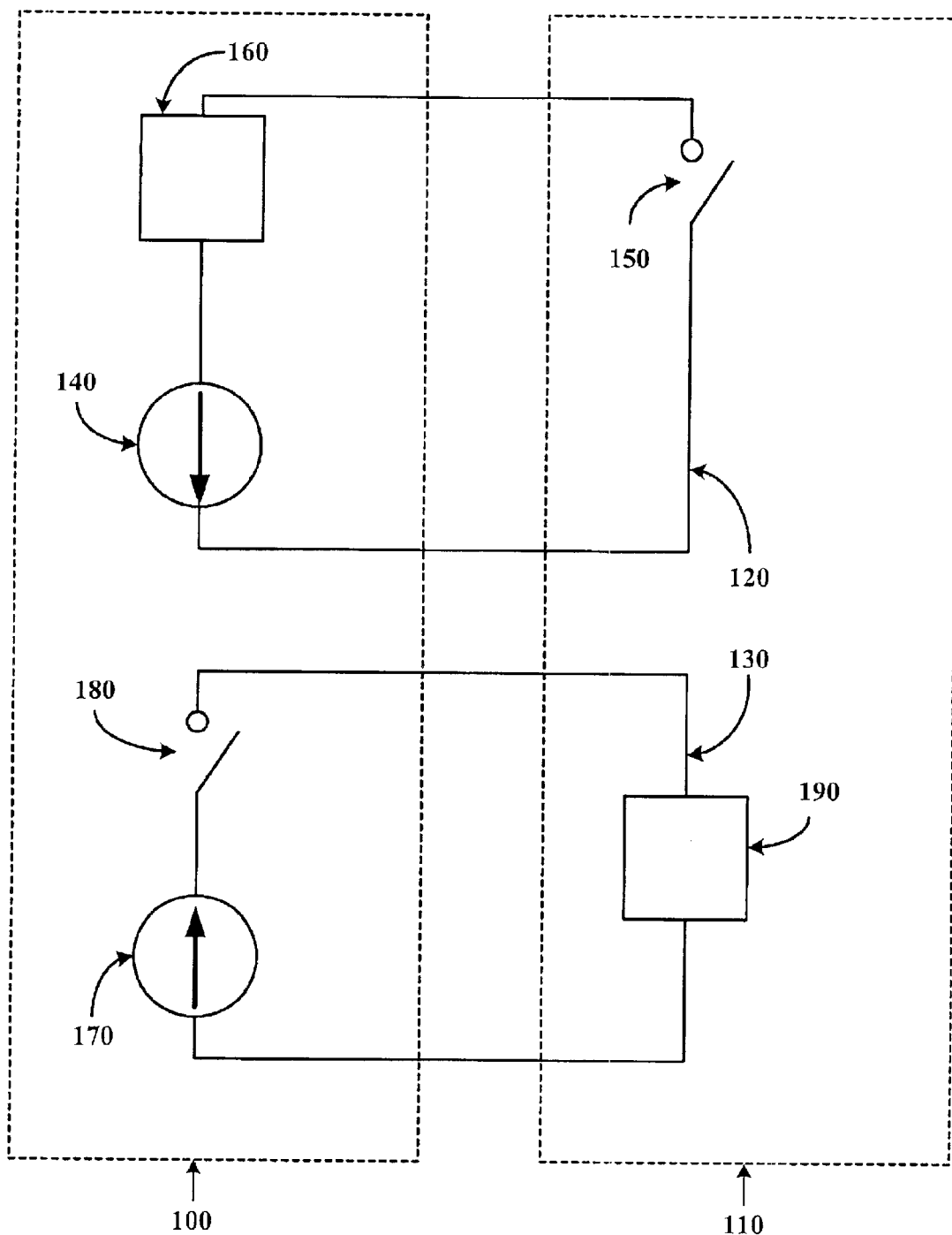
FIG. 1 illustrates a conventional full-duplex current loop.

A method and apparatus are described for providing a communication system using current detection.

In the following description, for the purposes of explanation, numerous specific details are set forth in order to provide a thorough understanding of the present invention. However, it will be apparent to one skilled in the art that the present invention may be practiced without some of these specific details. In other instances, well-known structures and devices are shown in block diagram form.

The present invention includes various processes, which will be described below. The processes of the present invention maybe performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

This application describes a method and apparatus for transmitting a balanced signal and detecting the signal using current detection. Under one embodiment, the transmission system may utilize a standard twisted pair cable for the transmission medium. According to one embodiment, the transmission line is a standard 100-ohm impedance cable. According to a further embodiment, a transmitter generates a signal by switching between two power sources, thereby creating a current signal. The transmitter creates a signal in which a positive domain signal and a negative domain signal are generated. The transmission is balanced and the positive and negative domain symmetric signals cancel or counter each other in the radio frequency domain. The system assists in the rejection of noise because of the balanced signal arrangement. As long as a signal on the transmission line is balanced, crosstalk on the transmission line is thereby largely eliminated. According to an embodiment, the signal on the transmission line never passes through the zero (0) volts ground reference and the current never changes direction on the separate wires of the transmission line. According to this embodiment, the detection system equalizes the two transmission channels and rejects the common mode noise. After the noise is cancelled, the residual signal is then amplified to a minimum 5-decibel signal to noise ratio (SNR) level. According to one embodiment, the signal is delivered into a high-speed current detector that converts the current signal into a TTL (transistor—transistor logic), ECL (emitter-coupled logic), PECL (pseudo emitter-coupled logic), or other type of signal for digital interfacing. In an embodiment, the ability to reduce the impact of noise on the transmission line allows increased speed of operation. According to a particular embodiment, using common forward error correction (FEC) techniques such as Reed Solomon, Turbo, or Viterbi codes allows for additional information throughput in a system.

According to one embodiment, the transmitter includes a direct current power source and a sinusoidal power source, such as a sine wave signal generator. In this embodiment, the transmitter transmits a signal on the transmission line by switching between the DC power source and the combination of the DC power source and the sine wave signal. The DC power source establishes the base voltage level of the signal. When switched, the system switches to the sum of the DC power source and the sine wave signal. According to one embodiment, the sine wave signal contains a DC offset such that the resulting sinusoid level is always above the base voltage level in the positive domain and below the base voltage level in the negative domain.

According to another embodiment, the sine wave signal contains no DC offset such that the base level is the x-axis of the resulting sinusoid. According to one embodiment, a low frequency (between 400 hertz and 3300 hertz) sinusoidal wave is used when transmitting through load coils. The advantage of the low frequency sine wave is that the load coils help maintain the power spectrum on the low frequency over distance to counter the attenuation of the transmission line, which enhances the transmission of the signal over longer distances. According to one embodiment of the invention, the voltage levels of the power sources are such that the current flowing through the transmission line does not change in direction. In this transmission system, the current differential of the transmission is maintained as the signal is attenuated over extended wire distances.

According to an embodiment, each load coil on the transmission line increases the relative low frequency spectral power on the line by approximately 8.5 dB, if the load coils are spaced correctly. Each load coil normally has no effect on the current level, with the current into the load coil being substantially the same as the current out of the load coil. However, a gain in the voltage provided by the load coil has a corresponding effect on current. The resulting effect of the transmission technique under an embodiment is that signal transmission is possible over extended distances at high speeds.

According to an embodiment, a receiver coupled to the transmission line includes a current detector that detects the transmitted signal. Under one embodiment, the receiver detects the signal by sensing changes in the magnetic field generated by the current flowing through the transmission line. In an embodiment of the communications system, the current produced always travels in one direction, but the current detector senses an apparent current direction change. According to an embodiment of the invention, a balanced signal is detected using a pair of current detectors.

According to one embodiment, the receiver utilizes a detector that is capable of detecting a current change in which a current of 7–10 milliamps flowing in one direction in a circuit changes to a current of 7–10 milliamps flowing in the other direction. According to one embodiment, the actual change in current in a transmission line could be much smaller than the change in current that the current detector can sense, but this actual change in current may be amplified, through use of a technology such as current feedback amplifiers, to a level that is high enough to be sensed by the current detector. Under one embodiment, the current detector included in the receiver is a magnetic field sensor, such as those produced by Nonvolatile Electronics, Inc. (NVE) of Eden Prairie, Minn. Under a particular embodiment, a magnetic field sensor contains giant magnetoresistive (GMR) materials in its construction. Using common forward error correction technology such as Reed Solomon, Turbo or Viterbi type codes will provide additional bandwidth increases.

Figure 3:
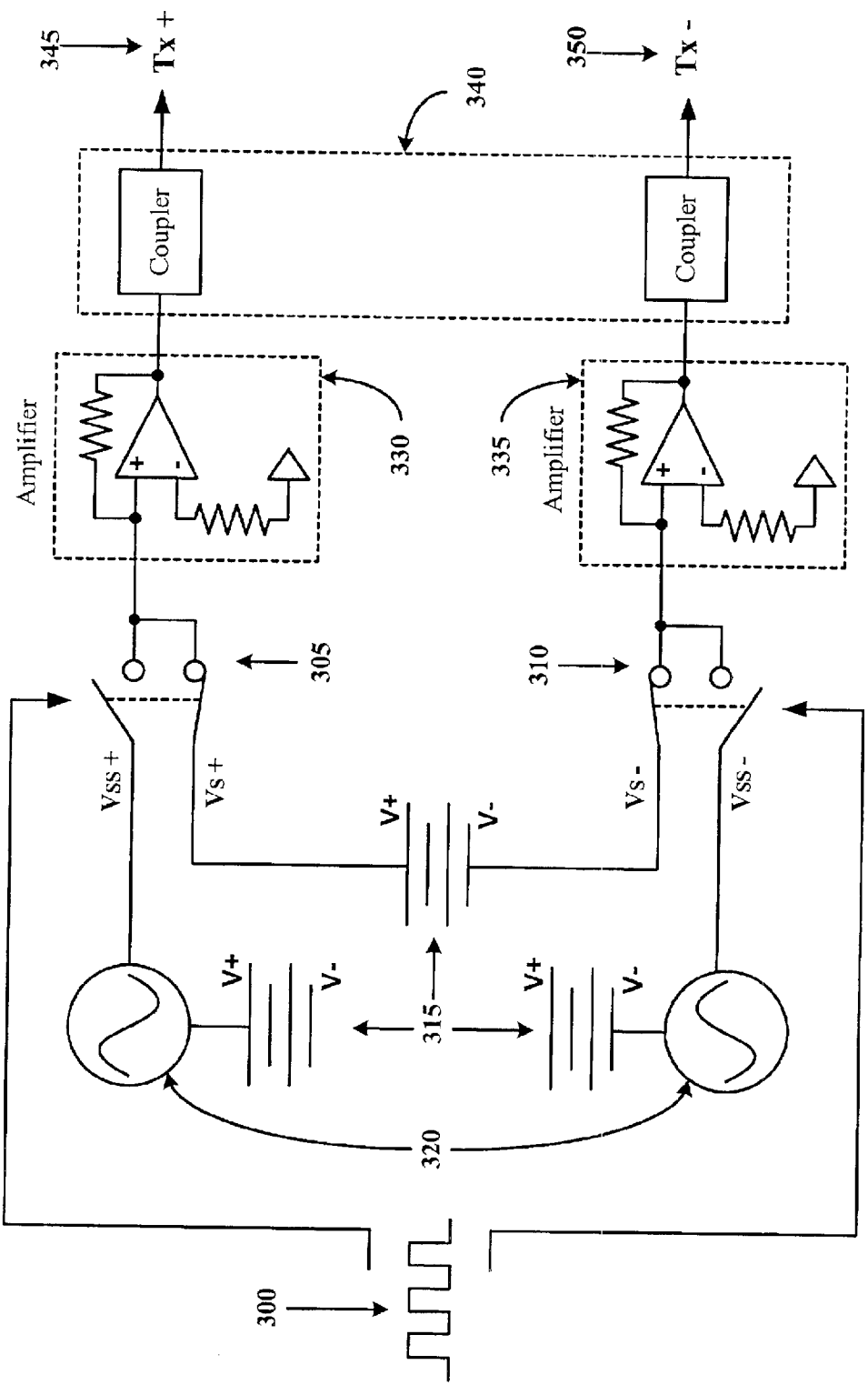
FIG. 3 is a diagram illustrating a transmitter under one embodiment.

FIG. 3 is an illustration of a transmitter according to one embodiment of the invention. In this embodiment, a digital signal 300 is transmitted. Digital signal 300 is used to control a positive domain switch 305 and a negative domain switch 310. Positive domain switch 305 switches between the positive voltage supplied by DC voltage source 315, designated as $V_s+$ in FIG. 3, and the sum of DC voltage source 315 and sine wave generator 320, designated as $V_{ss}+$ in FIG. 3. Negative domain switch 310 switches between the negative voltage supplied by DC voltage source 315, designated as $V_s-$ inb FIG. 3, and the sum of DC voltage source 315 and sine wave generator 320, designated as $V_{ss}-$ in FIG. 3. According to one embodiment, the signal provided by sine wave generator 320 to negative domain switch 310 is 180 degrees out of phase with the signal provided to positive domain switch 305. In FIG. 3, positive domain switch 305 is generating the positive domain image of the transmitted signal and switch 310 is generating the negative domain image of the transmitted signal. While the diagram contained in FIG. 3 conceptually shows DC voltage source 315 and sine wave generator 320 in multiple locations for simplicity, according to a particular embodiment the transmitter contains a single DC voltage source and a single sine wave generator.

In FIG. 3, amplifier 330 amplifies the positive domain signal image generated by switch 305 and amplifier 335 amplifies the negative domain signal image generated by switch 310. The positive and negative domain images of the signal then pass through coupler 340. The signal that is then transmitted on the transmission line is comprised of positive domain signal image $T_x+$ 345 and negative signal domain image $T_x-$ 350.

Figure 2:
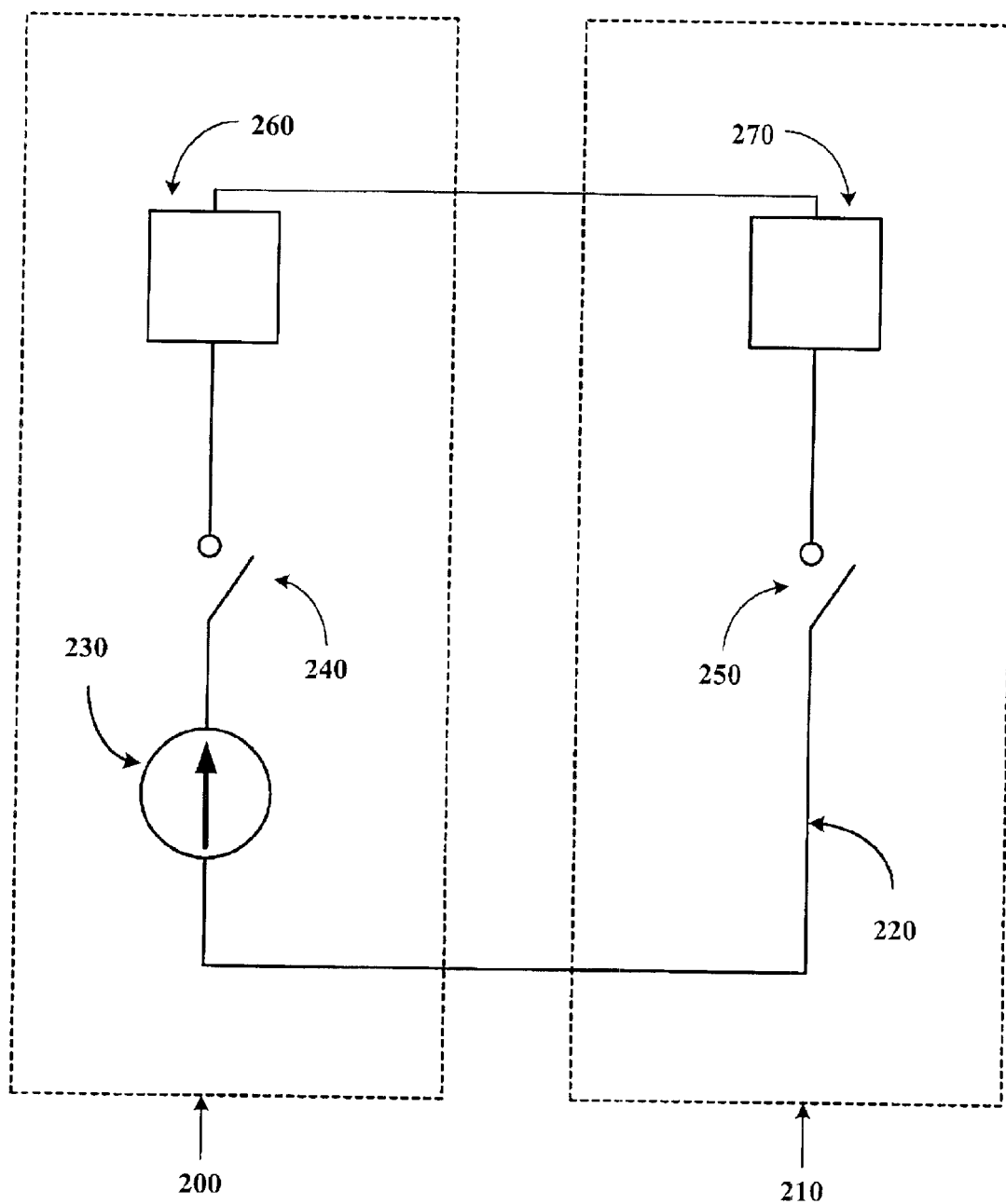
FIG. 2 illustrates a conventional simplex (or half-duplex) current loop.

In the embodiment of the transmitter shown in FIG. 3, the loop formed by the transmission line is closed at all times when the system is active and thus there is always a current flowing through the transmission line. This contrasts with the conventional current loops shown in FIGS. 1 and 2, in which a signal is generated by opening and closing the circuit. Under a particular embodiment, an active transmission line is indicated when current flows through the line and an inactive circuit is indicated when no current is flowing through the line. In this way, according to a particular embodiment a device may detect whether a transmission line is active by detecting whether any current is flowing through the transmission line.

Figure 4:
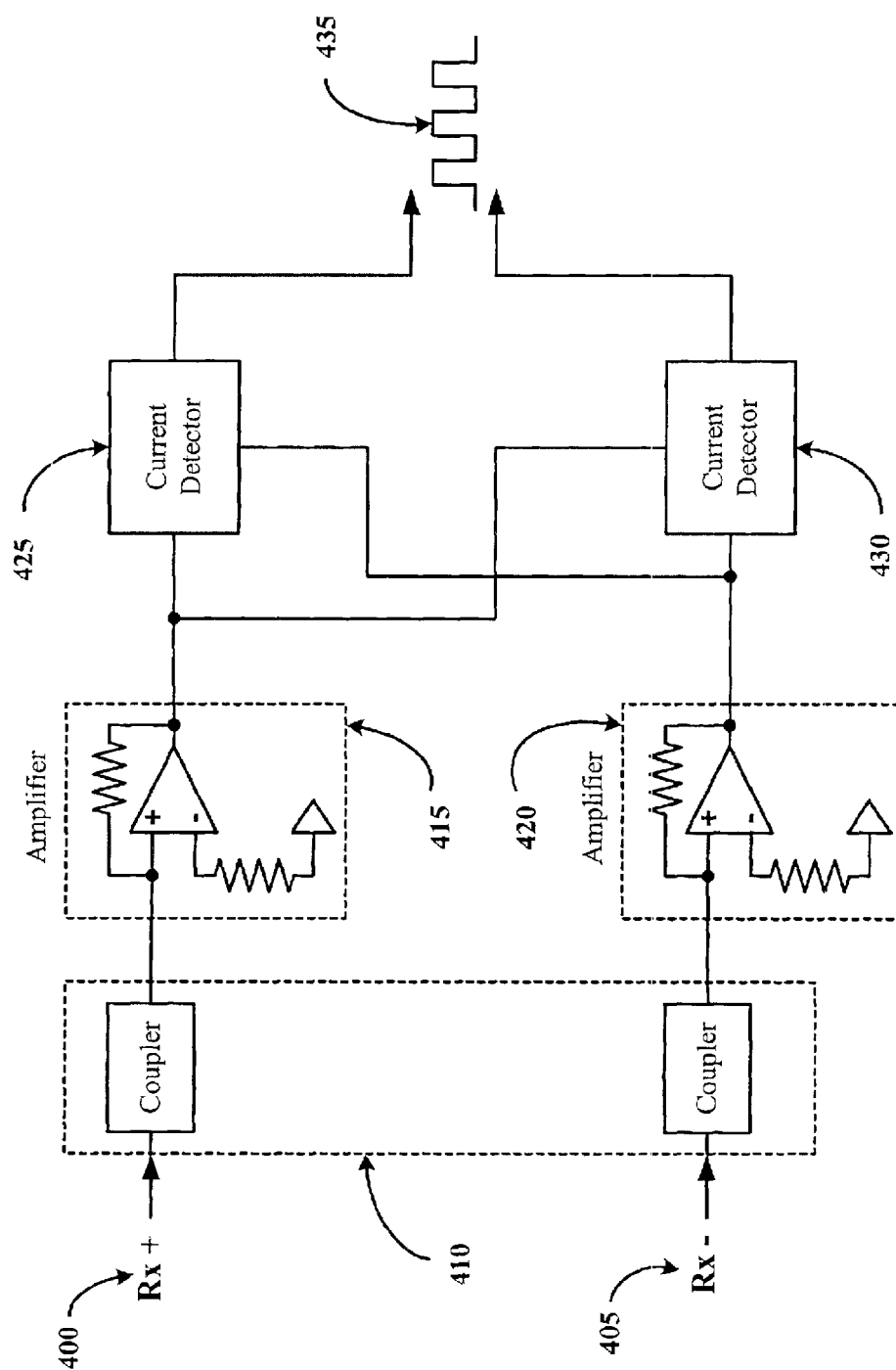
FIG. 4 is a diagram illustrating a receiver according to one embodiment.

FIG. 4 illustrates an embodiment of a receiver utilizing current detection. In FIG. 4, a positive domain image of a received signal $R_x+$ 400 and a negative domain image of the received signal $R_x-$ 405 are received. The received signal is passed through coupler 410. The positive domain image of the signal is amplified by amplifier 415 and the negative domain image of the signal is amplified by amplifier 420. According to one embodiment, amplifiers 415 and 420 are comprised of two or more amplification stages. The amplified signal is then detected by current detectors 425 and 430. According to one embodiment, current detectors 425 and 430 each utilize both the positive and negative images of the signal to detect the current changes. The resulting data 435 is then produced from the outputs of the current detectors 425 and 430.

In one embodiment of the invention, a transceiver includes both a transmitter that generates a balanced current signal and a receiver that detects a signal using current detection. An example of the transceiver would contain the elements shown in FIG. 3 and the elements shown in FIG. 4.

Figure 5:
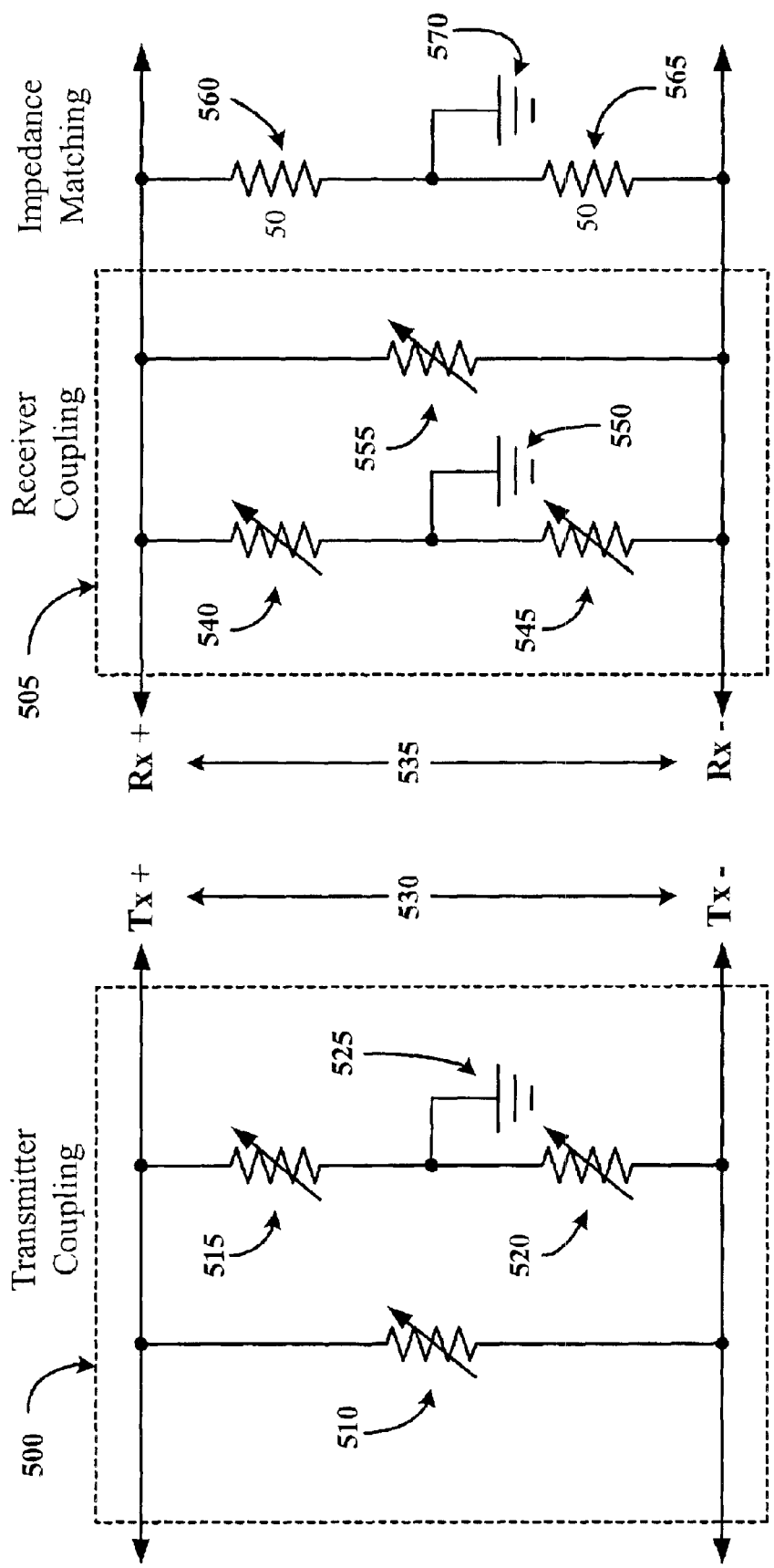
FIG. 5 illustrates embodiments of a transmitter coupling and a receiver coupling.

According to one embodiment, the coupling of a transmitter or receiver to the transmission line is shown in FIG. 5. In the transmitter coupling 500, variable resistor 510 is in parallel with the series combination of variable resistor 515 and variable resistor 520. According to this embodiment, the connection between variable resistor 515 and variable resistor 520 is connected to ground 525. Signal $T_x$ 530 is transmitted to a transmission line through the transmitter coupling 500. Under this embodiment, a transmitter is interfaced with a transmission line without the use of transformers.

Similarly, the receiver coupling 505 shown in FIG. 5 is comprised of variable resistor 555 in parallel with the series combination of variable resistor 540 and variable resistor 545. The connection between variable resistor 540 and variable resistor 545 is connected to ground 550. Signal $R_x$ 535 is received from a transmission line through the receiver coupling 505. According to this embodiment, a receiver is also interfaced with a transmission line without the use of transformers.

According to an embodiment of the invention, a receiver is impedance matched by placing two resistors of the same value in series, with one lead of one resistor being connected to one of the two wires in a transmission line and one lead of the other resistor being connected to the other transmission line wire. According to this embodiment, the connection between the two resistors is connected to ground. An example of impedance matching is shown in FIG. 5. Resistor 560 is in series with resistor 565, with the connection point between resistors 560 and 565 being connected to ground 570. In the example shown in FIG. 5, resistor 560 and resistor 565 are 50-ohm resistors to form a 100-ohm resistance to match the impedance of a 100-ohm transmission line.

Figure 6:
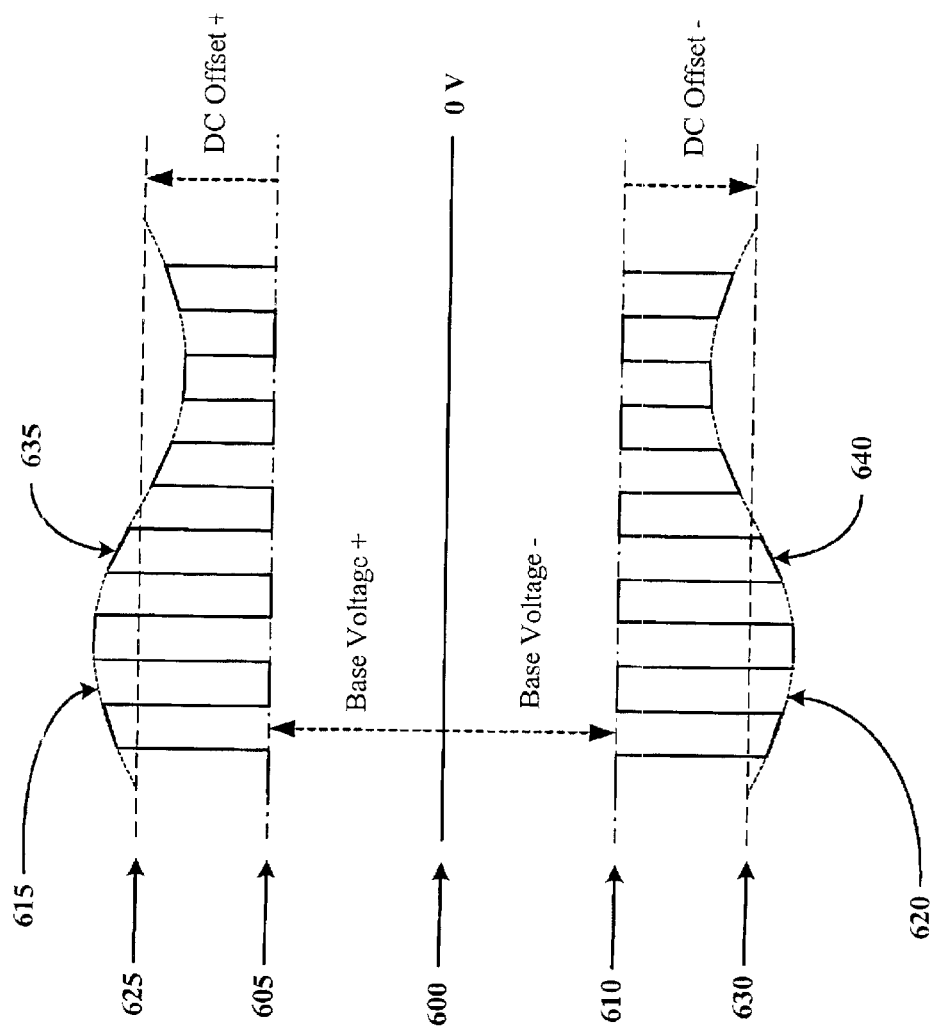
FIG. 6 illustrates a signal that is transmitted according to an embodiment in which a sine wave generator produces a DC offset voltage.

FIG. 6 contains a conceptual graph of a signal generated on a transmission line under one embodiment. In FIG. 6, a DC voltage source provides a positive base voltage level 605 above zero voltage level 600 and a negative base voltage level 610 below zero voltage level 600. A sine wave generator generates a sinusoidal waveform 615 for the positive domain image of the transmitted signal and a sinusoidal waveform 620 for the negative domain image of the transmitted signal, where sinusoidal waveform 620 is inverted, or shifted 180 degrees in phase, from sinusoidal waveform 615. In FIG. 6, the sine wave generator has generated a positive DC voltage offset 625 and a negative DC voltage offset 630. With the given voltage offsets 625 and 630, the positive domain image of the signal 635 is in the form of pulses rising above the positive base voltage level 605 to the level of sinusoidal waveform 615, and the negative domain image of the signal 640 is in the form of pulses falling below the negative base voltage level 610 to the level of sinusoidal waveform 620.

Figure 7:
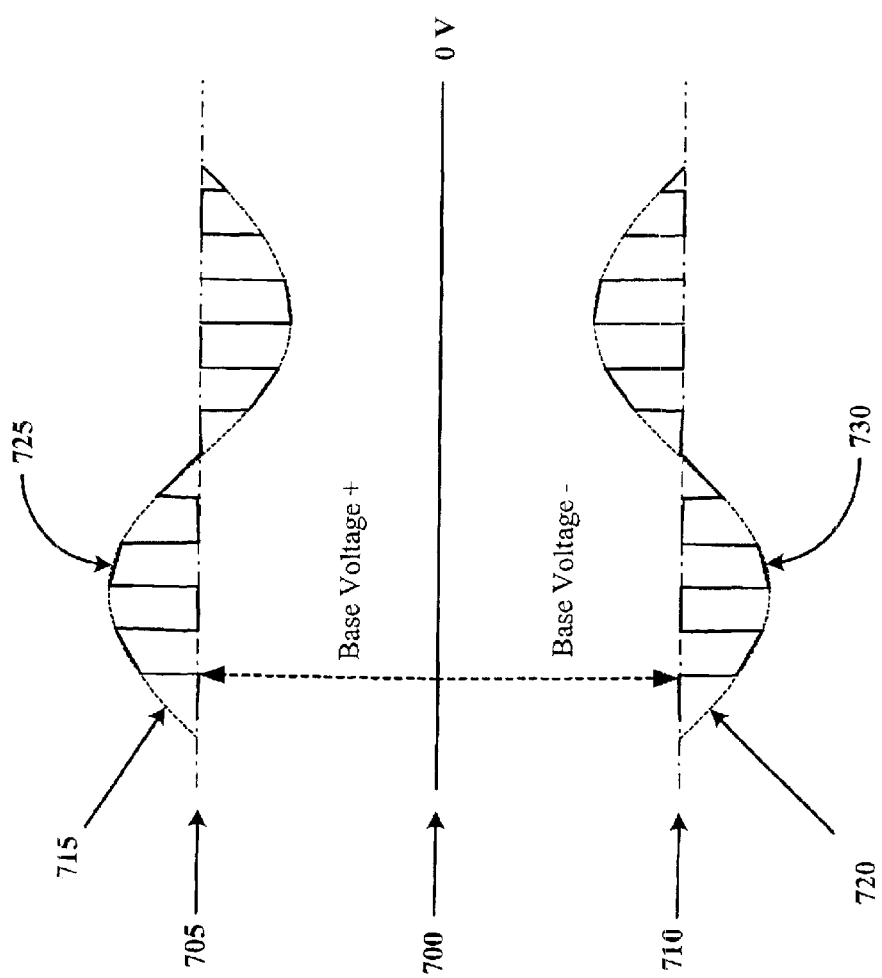
FIG. 7 illustrates a signal that is transmitted according to an embodiment in which a sine wave generator does not produce a DC offset voltage.

The DC voltage offset shown in FIG. 6 is not necessary to the operation of a transmitter or receiver, and other embodiments may contain other voltage levels or may contain no DC voltage offset. For example, FIG. 7 contains a conceptual graph of a signal transmitted on a transmission line under a particular embodiment in which no DC voltage offset is present. In FIG. 7, a DC voltage source provides a positive base voltage level 705 above zero voltage level 700 and a negative base voltage level 710 below zero voltage level 700. A sine wave generator generates a sinusoidal waveform 715 for the positive domain image of the transmitted signal and an inverted sinusoidal waveform 720 for the negative domain image of the transmitted signal. Without any DC voltage offset, the x-axes of sinusoidal waveforms 715 and 720 are positive base voltage level 705 and negative base voltage level 710. In the embodiment shown in FIG. 7, the positive domain image of the signal 725 is in the form of pulses above and below the positive base voltage level 705 to the sinusoidal waveform 715, and the negative domain image of the signal 730 is in the form of pulses above and below negative base voltage level 710 to the sinusoidal waveform 720.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
    connecting a transmitter to a transmission line;
    receiving a digital input signal comprising a plurality of bits; and
    transmitting the input signal on the transmission line by switching between a first power source and a second power source to generate a balanced current signal, the first power source comprising a direct current voltage source and the second power source comprising a sinusoidal waveform generator and the direct current voltage source.

2. The method of claim 1, wherein the balanced current signal comprises a positive domain image and a negative domain image and wherein the negative domain image is inverted from the positive domain image.

3. The method of claim 1, wherein the transmission line is a twisted pair cable.

4. The method of claim 1, wherein the sinusoidal waveform generator includes a direct current voltage offset.

5. A transmitter comprising:

a connection to a transmission line;

a plurality of power sources, the plurality of power sources comprising a first power source and a second power source, the first power source comprising a direct current voltage source, the second power source comprising a sinusoidal waveform generator and the direct current voltage source; and a switch, wherein the switch is coupled to the plurality of power sources and wherein the switch generates a balanced current signal by switching between the plurality of power sources, the balanced current signal representing a digital bitstream.

6. The transmitter of claim 5, wherein the balanced current signal comprises a positive domain image and a negative domain image and wherein the negative domain image is inverted from the positive domain image.

7. The transmitter of claim 5, wherein the transmission line is a twisted pair cable.

8. The transmitter of claim 5, wherein the sinusoidal waveform generator includes a direct current voltage offset.

* * * * *